United States Patent [19]

Lask

[11] Patent Number: 5,284,641
[45] Date of Patent: Feb. 8, 1994

[54] METHOD OF PRODUCING SILICON USING AN ELECTRI ARC LOW SHAFT FURNACE

[75] Inventor: Gert-Wilhelm Lask, Berus, Fed. Rep. of Germany

[73] Assignee: Applied Industrial Materials Corporation, Deerfield, Ill.

[21] Appl. No.: 923,183

[22] Filed: Jul. 27, 1992

[30] Foreign Application Priority Data

Aug. 8, 1991 [DE] Fed. Rep. of Germany ....... 4126254
Aug. 8, 1991 [DE] Fed. Rep. of Germany ....... 4126255

[51] Int. Cl.$^5$ ............................................. C01B 33/02
[52] U.S. Cl. ................................. 423/350; 423/349
[58] Field of Search ........................ 423/348, 349, 350

[56] References Cited

U.S. PATENT DOCUMENTS

| | | |
|---|---|---|
| 4,364,974 | 12/1982 | Lask . |
| 4,366,137 | 12/1982 | Lask . |
| 4,389,493 | 6/1983 | Lask . |
| 4,798,659 | 1/1989 | Dosaj et al. .......................... 204/164 |
| 4,820,341 | 4/1989 | Lask . |
| 4,975,226 | 12/1990 | Lask . |
| 5,073,107 | 12/1991 | Lask . |
| 5,078,927 | 1/1992 | Lask . |

FOREIGN PATENT DOCUMENTS

| | | | |
|---|---|---|---|
| 1518301 | 10/1989 | U.S.S.R. | ............................... 423/350 |
| 1655900 | 6/1991 | U.S.S.R. | ............................... 423/350 |
| 1678762 | 9/1991 | U.S.S.R. | ............................... 423/350 |

*Primary Examiner*—Olik Chaudhuri
*Assistant Examiner*—Ken Horton
*Attorney, Agent, or Firm*—Herbert Dubno; Jonathan Myers

[57] ABSTRACT

A carbide former is introduced into briquettes in the production of silicon in an electric-arc low-shaft furnace to improve the trapping of silicon oxide rising in the furnace and increase the silicon yield. The carbide former can be calcium, magnesium or aluminum, preferably in the form of the silicate and most advantageous is magnesium silicate.

2 Claims, No Drawings

METHOD OF PRODUCING SILICON USING AN ELECTRI ARC LOW SHAFT FURNACE

FIELD OF THE INVENTION

My present invention relates to a process for producing silicon by the reduction of quartz in a low shaft electric-arc furnace in which the electric arc furnace is supplied with a charge of shaped bodies of fine-particle quartz and fine-grain carbon carrier, generally as briquettes, together with particulate quartz. The furnace is so operated that the reduction mainly takes place in two stages, namely, in a first process stage at the upper part of the low shaft electric furnace so that in the briquettes there is a reduction of the fine-grained quartz to silicon carbide together with the formation of a coke-like structure with open pores.

In a second process stage the lower part of the electric arc low shaft furnace, the silicon carbide effects a reduction of the particulate quartz to silicon with the formation of gaseous silicon oxide which rises in the charge bed. Silicon oxide as referred to here is usually silicon monoxide. The quartz provided in granular form or in the form of pieces in the charge is molten at the reduction with silicon carbide and molten silicon is extracted from the system.

The invention also relates to an improved shaped body containing the finely divided quartz and the finely divided carbon carrier for carrying out this process.

BACKGROUND OF THE INVENTION

The above described use of an electric-arc low-shaft furnace for the production of silicon and ferrosilicon is known. The principles are described, for example, in U.S. Pat. No. 4,820,341 and in earlier patents including 4,366,137, 4,364,974 and 4,389,493. The production of raw material bodies especially suitable for producing silicon or silicon alloys is described in U.S. Pat. No. 5,078,927, for example, and reference may also be had to U.S. Pat. No. 4,975,226. The production of briquettes is likewise described in U.S. Pat. No. 5,073,107.

Using these systems and the briquettes as described, the reaction in the first process stage can be described by the following equation:

$$SiO_2 + 3C = SiC + 2CO,$$

This reaction in the first process stage is effected at a temperature of 1520° C. and higher. The reaction in the second stage corresponds to the following equations:

$$SiO_2 + 2SiC = 3Si + 2CO,$$

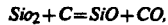
$$SiO_2 + C = SiO + CO,$$

and is effected at a temperature of 1800° to 2000° C. (see German Patent Document DE 20 55 564 and German Patent Document DE 30 32 720).

The compacts, i.e. the raw material bodies or briquettes must have chemical compositions corresponding to these equations and in general include a stoichiometric excess of carbon with respect to the reactions in which these compacts or briquettes play a role. In addition, the raw material compacts must have physical properties such that they satisfy the requirements of integrity along the path and the charge and remain intact from manufacture until they are introduced into the electric-arc low-shaft furnace, and in travel through the furnace until, of course, they participate in reaction with the molten quartz.

To produce such raw material compacts which satisfy the chemical and physical requirements, a number of processes have been proposed, including those identified above and those described in German Patent Documents DE 30 09 808, DE 34 25 716 and DE 39 39 018. For convenience, it is noted that DE 39 23 446 corresponds to U.S. Pat. No. 5,078,927, that DE 35 18 151 and 35 41 125 corresponds to U.S. Pat. No. 4,820,341, that DE 30 32 720 corresponds to U.S. Pat. No. 4,366,137, that DE 30 09 808 corresponds to U.S. Pat. No. 4,389,493, that DE 37 24 541 corresponds to U.S. Pat. No. 5,073,107 and U.S. Pat. No. 4,975,226 and that DE 30 23 297 corresponds to U.S. Pat. No. 4,364,974.

It is especially to be recognized as known that the porous and coke-like structure which is formed from the carbon and silicon carbide in the first stage within the briquette, contributes significantly to the silicon conversion because the silicon oxide formed in the second process stage and liberated as a gas would tend to be lost from the charge except that it taken up by the spongy coke-like structure of the briquettes and initially condensed so that it is entrained further in the charge with the briquettes and can be reacted within the pores of the compacted bodies to produce silicon.

Notwithstanding the fact that the briquettes as described contribute significantly to reduction in the loss of silicon monoxide and thus to greater silicon conversions, it has been found that further improvement is desirable.

OBJECTS OF THE INVENTION

It is, therefore, the principal object of the invention to improve upon the processes previously described, expressly in terms of increasing the silicon conversion or yield. Another object of this invention is to provide improved raw material compacts or briquets which contribute to the improvement in the silicon conversion or yield.

Yet another object of the invention is to provide an improved method and improved compacts for carrying out the silicon product whereby drawbacks of earlier systems are obviated.

DESCRIPTION OF THE INVENTION

These objects and others which will be apparent hereinafter are attained, in accordance with the invention, in an improved process for producing silicon by the reduction of quartz in an electric-arc low-shaft furnace, whereby the electric-arc low-shaft furnace is provided with a charge of raw material compacts containing finely divided quartz and a fine grain carbon carrier, and of particulate quartz in the charge, the furnace being operated basically in a two stage process in which in a first stage at an upper portion of the low shaft furnace a reduction of the finely divided quartz to silicon carbide is effected in the compacts with a furnace of a coke like structure with open pores, while in a second process stage at the lower portion of the electric-arc low-shaft furnace the silicon carbide effects a reduction of the particulate melted quartz to silicon, gaseous silicon monoxide is formed which lies in the charge and is trapped in the compacts thereabove. The improvement in this process is the addition of a carbide former to the raw materials compacts which thus can produce a carbide capable of producing the silicon monoxide to silicon, thereby liberating carbon oxide.

The amount of this additive is so selected that the silicon yield or conversion by comparison to operation with raw materials compacts without the additives, is subsequently increased.

In a preferred embodiment of the invention the amount of the additive is so selected that the silicon conversion, by comparison to operation without the additive, is increased by 5% by weight at least and preferably from 10 to 20% by weight.

Preferably the process is so effected with an additive in the form of a carbide former including at least one metal selected from the group which consists of magnesium, calcium and aluminum, although mixtures thereof are suitable as well. These carbide formers can be present in the raw material compact in amounts of 0.1 to 1.0% by weight thereof, reckoned in terms of the metal content.

The invention makes use of the surprising and hitherto unrecognized discovery that, in the prior process, the silicon yield appears to be self limiting and by the use of the additive of the invention the silicon conversion can be greatly increased. The effect is most noticeable utilizing conversional technology and conventional low-shaft furnace operations.

According to a feature of the invention the carbide former is provided within the compact or briquette in the form of its silicate or in the form of silicates of two or more of the carbide formers. The conversion of the silicates with carbon in the compacts to the carbide is effected below the melting point of the silicate or silicates.

An especially pronounced increase of the silicon yield or conversion is effected in accordance with a preferred embodiment of the invention wherein the carbide is formed at the upper region of the electric-arc low-shaft furnace and in this region silicon oxide is reduced.

This type of operation has been found to provide a furnace process which can be easily followed by tests, thereby enabling parameters like the size of the raw material compacts, the size of the pieces of quartz utilized in the charge, the energy supplied via the electrodes and the throughput to be adjusted to optimize the process.

To an extent the invention is therefore based upon the discovery that, within the raw material compacts within the electric-arc low-shaft furnace a number of phenomena occur which hitherto have been unobserved and not utilized and which, by the addition of a carbide former, can be utilized to improve the silicon conversion and yield.

In a preferred embodiment of the invention the additive is magnesium silicate and the amount of magnesium silicate added is sufficient to increase the silicon yield or conversion by at least 5% over operation with magnesium-free raw materials compacts.

More preferably, the amount of magnesium silicate added is so selected that the silicon yield is increased by 10 to 20% by weight over operation with magnesium-free raw material compacts.

The electric-arc low-shaft furnace is so operated that in the upper region thereof the magnesium silicate in the raw compacts is as easily converted to magnesium carbide and this remains in the compact and in free spaces or interstices in the charge, where the silicon oxide gas rises tends to reduce the silicon oxide to silicon.

The raw material compacts can contain, apart from magnesium silicate, other carbide forming silicates with the carbide being produced under the conditions in the electric-arc low-shaft furnace. Small amounts of corresponding oxides can be present as well.

Stated otherwise, the invention is the use of magnesium silicate for the indicated purpose and under the conditions stated. To explain the effects utilized by the invention I have provided below a number of overall reactions which do not interfere with the thermodynamics of the low shaft furnace but which increase the silicon yield. While the formulas are given in terms of magnesium and magnesium silicate, other carbide formers may be used.

Initially magnesium carbide is formed from the magnesium silicate in accordance with the overall formula $$MgSiO_3 + 4C = MgC_2 + SiO + 2CO.$$

The gaseous silicon oxide reacts with the magnesium carbide in accordance with the formula $$MgC_3 + 2SiO = Mg + 2Si + 2CO.$$

The molten silicon is converted at the upper part of the furnace to its carbide in the accordance with the formula $$2Si + 2C = 2SiC.$$

The magnesium which is liberated is gaseous and can react immediately with carbon to reform the magnesium carbide:

$$Mg + 2C = MgC_2.$$

As a result the magnesium carbide formed from the magnesium silicate functions as a silicon oxide getter or trap. The loss of silicon oxide from the system is suppressed and the formation of silicon carbide simplified.

From the point of view of furnace operation it will be apparent that much reactants to the present invention, like silicon oxide, silicon and magnesium are, at appropriate points, in nonsolid forms. While quartz sand and solid carbon react with one another via solid/solid diffusion until about 1700° C. and the separation of them is a reaction limiting condition since the contact zones between them is limited and tends to reduce during the reaction, the silicon oxide formation increases because there is a reduction in carbon levels at the region of the melting of the quartz pieces in the second or lower stage. As a consequence, the reaction of silicon oxide with magnesium carbide provides a significant contribution to the silicon formation.

In prior art systems, it was possible that the silicon oxide level was such that not all the silicon oxide could be trapped by the compacts. With the present invention, however, the silicon oxide is practically fully reacted and hence the capacity to absorb and adsorb silicon monoxide in the compact is greatly increased. Because of the formation of magnesium carbide from magnesium vapor and excess carbon, the magnesium is continuously recycled. The result is an increase in the silicon yield. Magnesium carbide remains effective until the end of the reduction process as long as the compacts retain their shape and integrity. In the widening pores, greater amounts of silicon oxide can be trapped even at temperatures in excess of 1700° C. so that the silicon oxide can be reduced effectively. The progressively increasing carbon utilization in the compacts ultimately results in a decomposition of the compacts and any silicon carbide which remains can react with molten quartz. Any magnesium in the free volume of the charge has a last chance to reduce silicon oxide. Ultimately magnesium oxide is entrained off in the exhaust gas of the furnace to the gas cleaning plant where it is collected with other dust.

The invention also comprises the raw material compact or briquette for carrying out the process described above and, as noted, constituted of an intimate mixture of fine grained quartz sand and a fine grained noncaking carbon carrier and a finely divided carbide former or a plurality of finely divided body of carbide formers. The mixture can be briquetted in a bituminous binder and can have a carbon content greater than that required for reaction in which the briquette is to participate. In other words the carbon content of the briquette is in stoichiometric excess. The preferred carbide former is magnesium and is present in the briquette in the form of finely divided magnesium silicate.

The compact can be fabricated by any of the processes described in the patents and patent publications mentioned previously and dealing with the production of briquettes for reaction to produce silicon in the low-shaped furnace.

The preferred noncaking carbon carrier is petroleum coke and the bituminus binder can be a pitch/coal alloy. The proportions of the raw materials constituting the briquettes and of the binder can be those found to be suitable in the prior art. The material which is briquetted can include up to 65% by weight quartz sand, preferably 15 to 40% by weight quartz sand and 0.5 to 5.0% by weight magnesium silicate, the balance being petroleum coke and the bituminous binder. The bituminous binder may be constituted from, say, 7% by weight of the mixture pitch, especially coal-dervied and/or crude oil derived pitch, and at least 124 by weight caking coal.

The raw material compact can be subjected to a process which includes a heat treatment for hardening the briquettes. The heat treatment can be carried out in a sand bed in a rotary furnace with a sand temperature of about 500° C. (see DE 37 24 541).

Surprisingly, the green strength of the briquettes fed to the charge of the low-shaft furnace after hardening of the briquette during travel through the low shaft furnace is not adversely effected in spite of the addition of magnesium silicate although it has been found in coke technology that alkali compounds and alkaline earth compounds may be detrimental to briquettes containing coke or the like.

In a preferred embodiment of the invention, magnesium silicates of different sources can be used. For example, I can make use of pure magnesium silicate or of talc or olivine, the latter being a minimal of the composition $(Mg,Fe)_2SiO_4$, which has an orthorombic prismatic to thick platelet form, glassy shiny crystals. Talc is a mineral of the chemical composition $Mg_3(OH)_2 \cdot (Si_4O_{10})$. Neither olivine nor talc produce by-products or contain substances which are detrimental to the processes of the invention.

It is also possible to use practically pure magnesium silicate.

With the present invention the amount of the additive is so selective that the silicon yield with the briquettes of the invention is increased by 5 weight percent at a minimum and preferably 10 to 20 weight percent by comparison with magnesium free briquettes. It is relatively simple to determine the exact amount of magnesium, depending upon the source, which must be added for this purpose. In any event the magnesium should be present in an amount of 0.1 to 1.0 by weight of the starting composition. The actual amount will depend on the impurities present in the raw material and the types of carbide reactions which take place. These impurities have the drawback that they may alloy with the silicon metal. Such alloying does not occur with pure raw materials and magnesium silicates since the boiling point of magnesium metal is 1100° C. and the magnesium metal or its oxide will discharge from the furnace at the end of the process. High purity silicon metal can be obtained on the use of magnesium silicates, petroleum coke, pitch, ash free coal and quartz sand.

EXAMPLE

A mixture consisting of 35 weight percent finely milled quartz sand, 5.0% by weight magnesium silicate, 20% by weight noncaking carbon carrier in the form of petroleum coke, 16% by weight pitch and 24% by weight caking coal, caking coal forming the binder are protected by the apparatus described in U.S. Pat. No. 4,975,226. The briquettes have the strength described in that patent.

The briquettes are used in the process described in U.S. Pat. No. 4,820,341 to produce molten silicon. A silicon yield without the magnesium of about 80% was obtained and with the magnesium the yield was raised to about 95%. The conditions used were those set out in the specific examples of U.S. Pat. No. 4,820,341.

I claim:

1. In a method of producing silicon by reduction of quartz in an electric-arc low shaft furnace which comprises the steps of:
   (a) forming raw material compacts which comprise fine grained quartz and a stoichiometric excess of fine grained carbon carrier;
   (b) charging a low shaft electric arc furnace with said compacts in admixture with pieces of quartz;
   (c) effecting a two stage reaction in said furnace whereby in a first process stage at an upper portion of said shaft furnace, quartz in said compacts undergoes reduction to form silicon carbide to produce a coke-like structure with open quartz comprising the silicon carbide and unreacted fine grained carbon carrier, and in a second process stage at a lower portion of said furnace said silicon carbide reduces molten quartz to silicon while silicon monoxide is formed by reduction of the molten quartz with the unreacted carbon carrier and rises in the charge of said furnace:
   the improvement wherein carbide-forming magnesium silicate is added in the first process stage to said compacts, said magnesium silicate being reduced by the fine grained carbon carrier to form magnesium carbide and silicon monoxide at a temperature below the melting temperature of magnesium silicate within said compacts in the upper portion of said shaft furnace, following which the magnesium carbide reacts with the silicon monoxide to form elemental silicon which reacts with unreacted fine grained carbon carrier to form silicon carbide for use in the second process stage to form silicon; and
   wherein the amount of said magnesium silicate is so selected that the silicon yield is increased by at least 5% by weight over a process operating without said magnesium silicate.

2. The method of producing silicon defined in claim 1 wherein the amount of the carbide-forming magnesium silicate is sufficient to raise said silicon yield by 10 to 20 weight per cent.

* * * * *